(12) United States Patent
Csapo (10) Patent No.: US 8,125,946 B2
(45) Date of Patent: Feb. 28, 2012

(54) WIRELESS NETWORK AND MOBILE STATIONS FOR IMPLEMENTING VARIABLE BANDWIDTH SERVICE ON DEMAND

(75) Inventor: John S. Csapo, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1150 days.

(21) Appl. No.: 10/928,584

(22) Filed: Aug. 27, 2004

(65) Prior Publication Data

US 2005/0259684 A1 Nov. 24, 2005

Related U.S. Application Data

(60) Provisional application No. 60/573,361, filed on May 21, 2004.

(51) Int. Cl.
*H04J 3/16* (2006.01)
*H04W 72/00* (2009.01)
(52) U.S. Cl. .............. 370/329; 370/468; 455/452.2
(58) Field of Classification Search .............. 370/310, 370/319, 329, 343, 344, 349, 468, 480; 455/450, 455/452.1, 452.2, 509
See application file for complete search history.

(56) References Cited

U.S. PATENT DOCUMENTS

| | | | | |
|---|---|---|---|---|
| 5,479,447 A * | 12/1995 | Chow et al. | ............ | 375/260 |
| 5,682,419 A * | 10/1997 | Grube et al. | ............ | 455/450 |
| 5,978,117 A * | 11/1999 | Koonen | ............ | 398/116 |
| 6,246,713 B1 * | 6/2001 | Mattisson | ............ | 375/132 |
| 6,381,460 B1 * | 4/2002 | Klein et al. | ............ | 455/450 |
| 6,553,006 B1 * | 4/2003 | Kalliokulju et al. | ............ | 370/310 |
| 6,754,195 B2 * | 6/2004 | Webster et al. | ............ | 370/335 |
| 6,996,399 B2 * | 2/2006 | Zinn | ............ | 455/450 |
| 7,116,682 B1 * | 10/2006 | Waclawsky et al. | ............ | 370/468 |
| 7,212,542 B2 * | 5/2007 | Khawand | ............ | 370/464 |
| 7,433,311 B1 * | 10/2008 | Kalyanasundaram et al. | ............ | 370/235 |
| 7,433,965 B2 * | 10/2008 | Kawai et al. | ............ | 370/351 |
| 2002/0015477 A1 * | 2/2002 | Geile et al. | ............ | 379/56.2 |
| 2002/0103004 A1 * | 8/2002 | Vassilovski et al. | ............ | 455/426 |
| 2003/0123425 A1 * | 7/2003 | Walton et al. | ............ | 370/341 |
| 2003/0125039 A1 * | 7/2003 | Lachtar et al. | ............ | 455/453 |
| 2003/0235171 A1 * | 12/2003 | Lundstrom et al. | ............ | 370/338 |
| 2004/0156341 A1 * | 8/2004 | Cheng et al. | ............ | 370/335 |
| 2005/0107107 A1 * | 5/2005 | Shahidi et al. | ............ | 455/522 |

\* cited by examiner

*Primary Examiner* — Aung S Moe
*Assistant Examiner* — Kerri Rose (57) ABSTRACT

A variable bandwidth controller for use in a wireless network comprising base stations capable of operating on N carriers. The variable bandwidth controller determines a receiver capability of a first mobile station and, in response to the determination, assigns the first mobile station to operate on at least a first carrier and a second carrier. The variable bandwidth controller determines the receiver capability of the first mobile station based on a message received from the first mobile station. The variable bandwidth controller assigns the mobile station to operate on the first carrier during normal data traffic conditions and assigns the mobile station to operate on the second carrier during peak data traffic conditions.

22 Claims, 5 Drawing Sheets

WIRELESS NETWORK AND MOBILE STATIONS FOR IMPLEMENTING VARIABLE BANDWIDTH SERVICE ON DEMAND

CROSS-REFERENCE TO RELATED APPLICATION AND CLAIM OF PRIORITY

The present invention is related to that disclosed in U.S. Provisional Patent Application Ser. No. 60/573,361, filed May 21, 2004, entitled "Variable Bandwide". U.S. Provisional Patent Application Ser. No. 60/573,361 is assigned to the assignee of the present application. The subject matter disclosed in U.S. Provisional Patent Application Ser. No. 60/573,361 is hereby incorporated by reference into the present disclosure as if fully set forth herein. The present invention hereby claims priority under 35 U.S.C. §119(e) to U.S. Provisional Patent Application Ser. No. 60/573,361.

TECHNICAL FIELD OF THE INVENTION

The present invention generally relates to wireless communications and, more specifically, to a wireless network that implements variable bandwidth service on demand and mobile stations for operating in such a wireless network.

BACKGROUND OF THE INVENTION

Wireless communication systems have become ubiquitous in society. Consumers use a wide range of devices and networks, including cellular phones, paging devices, personal communication services (PCS) systems, and wireless data networks. Wireless service providers are creating new markets for wireless devices and expanding existing markets by making wireless devices and services cheaper and more reliable. Wireless service providers attract new customers by reducing infrastructure costs and operating costs, by increasing handset battery life, and improving quality of service, and new and better features.

Wireless service providers may improve the quality and variety of services in a number of ways, including providing data services to the latest generation of mobile stations (e.g., cell phones, wireless laptops) and other wireless terminals. A number of technologies are able to deliver data services (e.g., web browsing, e-mail) or a mixture of voice and data services. For instance, in CDMA2000 (or IS-2000) technology, IS-2000-1xEV-DO networks provide data service and IS-2000-1xEV-DV provided voice and data services.

However, the services provided by conventional wireless networks are limited in large part by the frequency assignments (or carriers) of each network. It is noted that the term "frequency assignment" and "carrier" are used synonymously herein. The term "frequency assignment" is more commonly used in Europe and Asia and the term "carrier" is more commonly used in North America. Conventional base stations and mobile stations are limited to transmitting and receiving on a particular carrier (or frequency assignment). For example, an IS-2000-1xEV-DO network has a frequency assignment (FA) that limits the transmission of data to the maximum bandwidth of the forward channel carrier. Similarly, an IS-2000-1xEV-DV network has a frequency assignment (FA) that has a limited number of carriers for transmitting voice to a mobile station and a limited number of carriers for transmitting data to a mobile station.

In either type of network, if a mobile station must receive a large burst of data, the downlink (or forward channel) bandwidth is limited by the frequency assignment of the network. Mobile stations rarely need to operate at very high data rates, so the bandwidth of the carrier in each network is generally suited to meet the average bandwidth requirements of mobile stations. Thus, when a mobile station does experience a demand peak, the carrier limitations of the downlink cause delays and loss of data.

Therefore, there is a need in the art for improved wireless networks having increased downlink capacity. In particular, there is a need for wireless networks and wireless terminals that are not limited by inflexible frequency assignments of the wireless network.

SUMMARY OF THE INVENTION

The present invention improves wireless service by providing variable bandwidth to mobile stations on demand. The present invention is suited to many different types of wireless technologies, but is particularly suited for implementation with IS-2000-1xEV-DV networks. The present invention uses base stations that have N carriers or frequency assignments (FAs). These base stations communicate with variable-bandwidth (VB) mobile stations that are capable of simultaneously operating on N carriers. In a typical embodiment, N=2, so that the base stations and mobile stations operate on two carriers, namely a first carrier or frequency assignment (FA1) and a second carrier or frequency assignment (FA2). However, in alternate embodiments of the present invention, N may be 3 or 4, or greater.

According to the principles of the present invention, each base station of the wireless network is capable of determining a type associated with each mobile station that accesses the bas station. The base station determines from the mobile station type whether or not the mobile station is capable of receiving on more than one carrier. The base station is then able to provide variable bandwidth service on demand to the mobile station depending to the mobile station type.

According to an exemplary embodiment of the present invention, a first type of mobile station (Type 0) uses a single receiver to receive on only one carrier. Type 0 mobile stations would include the current generation or 1xEV-DV and 1xEv-DO mobile stations. A second type of mobile station (Type 1) uses two receivers to receive on two carriers. A third type of mobile station (Type 2) uses four receivers in a diversity configuration to receive on two carriers.

To address the above-discussed deficiencies of the prior art, it is a primary object of the present invention to provide a variable bandwidth controller for use in a wireless network comprising a plurality of base stations capable of operating on N carriers. According to an advantageous embodiment of the present invention, the variable bandwidth controller is capable of determining a receiver capability of a first mobile station and, in response to the determination, assigning the first mobile station to operate on at least a first carrier and a second carrier.

According to one embodiment of the present invention, the variable bandwidth controller determines the receiver capability of the first mobile station based on a message received from the first mobile station.

According to another embodiment of the present invention, the message is a control message in an IS-2000 compatible network.

According to still another embodiment of the present invention, the variable bandwidth controller assigns the mobile station to operate on the first carrier during normal data traffic conditions and assigns the mobile station to operate on the second carrier during peak data traffic conditions.

According to yet another embodiment of the present invention, the variable bandwidth controller dynamically assigns the first mobile station to operate on the second carrier based on changes in traffic demand.

According to a further embodiment of the present invention, the variable bandwidth controller assigns the first mobile station to operate on the second carrier in response to a determination by the variable bandwidth controller that the first mobile station requires additional bandwidth in a forward channel.

According to still further embodiment of the present invention, the variable bandwidth controller assigns the first mobile station to operate on the second carrier in response to a request from the first mobile station for additional bandwidth in a forward channel.

It is another primary object of the present invention to provide a mobile station capable of communicating with a plurality of base stations of a wireless network. According to an advantageous embodiment of the present invention, the mobile station comprises: 1) a first receive path capable of receiving data from a first of the plurality of base stations on a first carrier; and 2) a second receive path capable of receiving data from the first base station on a second carrier. The mobile station is capable of receiving control messages from the first base station assigning the mobile station to receive data from the first base station on the first carrier during normal traffic conditions and assigning the mobile station to receive data from the first base station on the second carrier during peak traffic conditions.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
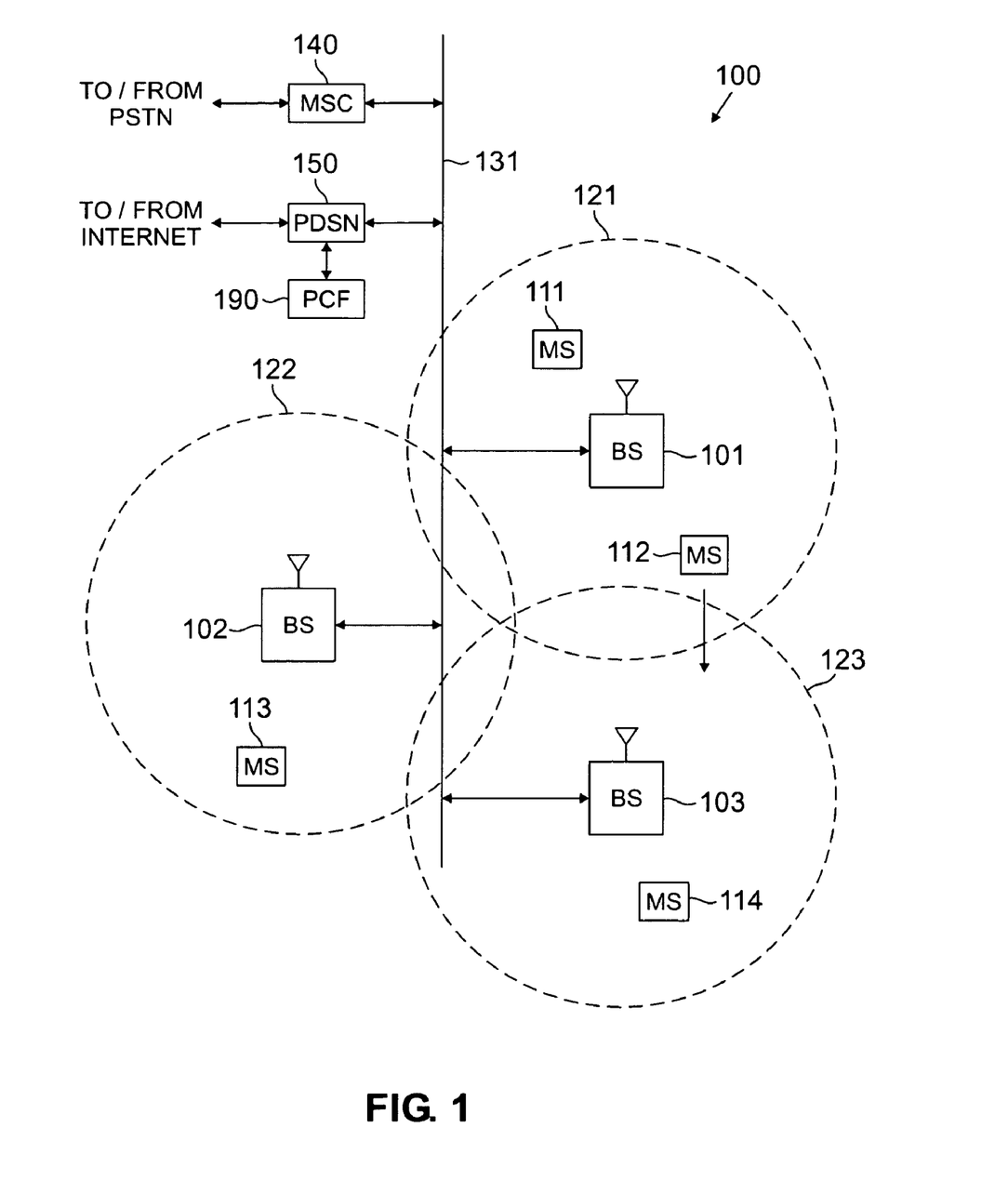
FIG. 1 illustrates an exemplary wireless network that implements variable bandwidth service on demand according to the principles of the present invention.

FIG. 1 illustrates exemplary wireless network 100, which implements variable bandwidth on-demand service according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 using, for example, the CDMA2000 air interface standard. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

In an advantageous embodiment of the present invention, mobile stations 111-114 are capable of receiving data traffic and/or voice traffic on two or more channels in a carrier simultaneously. Mobile stations 111-114 are also capable of receiving data traffic and/or voice traffic on two or more carriers or frequency assignments simultaneously. A first carrier (or frequency assignment) is referred to as "FA1" and a second carrier (or frequency assignment) is referred to as "FA2".

The present invention is not limited to communicating with mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna system coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
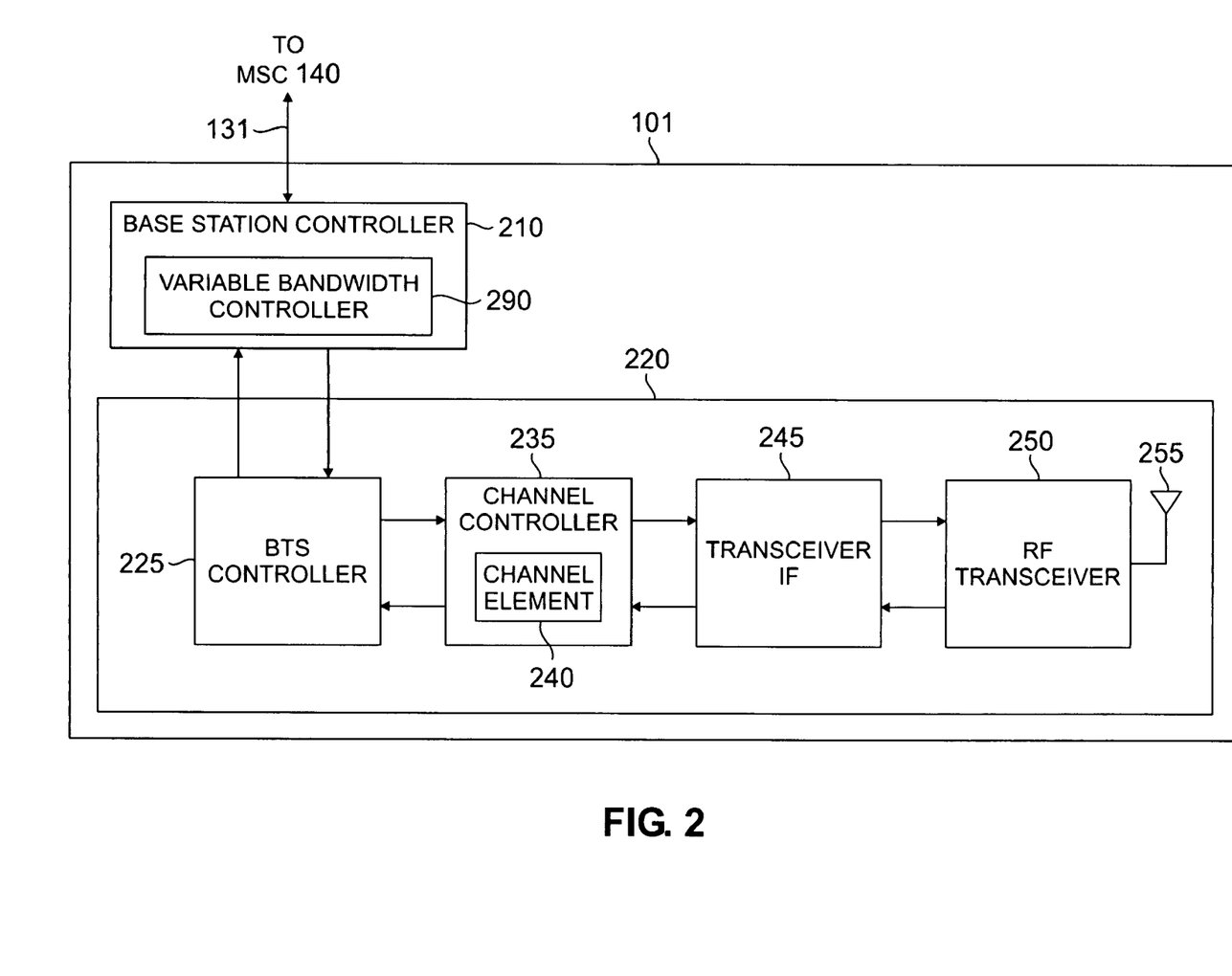
FIG. 2 illustrates an exemplary base station that implements variable bandwidth service on demand according to an exemplary embodiment of the present invention.

FIG. 2 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BSC 210 comprises variable bandwidth controller 290, among other functional components. BTS 120 comprises BTS controller 225, channel controller 235 (which contains representative channel element 240), transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel transmits outbound signals from the base station to the mobile station and a reverse channel transmits inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

According to the principles of the present invention, antenna array 255 comprises a plurality of antennas capable of transmitting and receiving on N different carriers. For example, if N=2, then antenna array 255 may comprise a first antenna that operates on a first carrier (FA1) and a second antenna that operates on a second carrier (FA2). In alternate embodiments of the present invention, BS 101 may use more than two carriers (i.e., N=3, N=4, etc.), in which case, antenna array 255 may transmit and receive on additional carriers (e.g., FA3, FA4)

Variable bandwidth controller 290 is capable of receiving from mobile stations accessing BS 101 control messages that indicate the capabilities of the mobile stations. For example, when MS 111 accesses BS 101, MS 111 may transmit an Origination message containing a Type field that indicates the type of transceiver configuration in MS 111. The use of the Origination message to convey the Type field is by way of example only and should not be construed in a manner that limits the scope of the present invention. Those skilled in the art will appreciate that the present invention may be easily modified to use other protocol messages to convey the Type field to variable bandwidth controller 290.

The Type field may indicate that MS 111 is a Type 0 device that uses a single receive path to receive on only one carrier. For instance, a conventional 1xEV-DV or 1xEv-DO mobile station would be a Type 0 device. Alternatively, the Type field may indicate that MS 111 is Type 1 device that uses two receivers to receive on two carriers. In another alternative, the Type field may indicate that MS 111 is a Type 2 device that uses four receivers in a diversity configuration to receive on two carriers.

Variable bandwidth controller 290 uses the Type field to determine the downlink (or forward channel) capability of MS 111. Depending on the number of receive paths in MS 111, variable bandwidth controller 290 may modify the number of carriers and channels used to transmit data to MS 111. Variable bandwidth controller 290 may use a message such as the Extended Channel Assignment Message (ECAM) to assign MS 111 to receive on two or more carriers. The use of the ECAM to configure MS ill is by way of example only and should not be construed in a manner that limits the scope of the present invention. Those skilled in the art will appreciate that the present invention may be easily modified to use other protocol messages to configure the receive paths of MS 111.

BS 101 may transmit data to MS 111 using a single carrier, such as FA1. However, BS 101 also may alternate transmission on the FA1 and FA2 carriers in order to provide time and coding diversity. For example, BS 101 may transmit odd-numbered data packets on FA1 during odd-numbered time slots and may transmit even-numbered data packets on FA2 during even-numbered time slots. Alternatively, BS 101 may transmit odd-numbered data packets on FA1 during all time slots while simultaneously transmitting even-numbered data packets on FA2 during all time slots.

The implementation of variable bandwidth controller 290 in BSC 210 is by way of illustration only and should not be construed in a manner that limits the scope of the present invention. In an alternate embodiment, variable bandwidth controller 290 may be implemented in BTS 220 or in an external device coupled to BS 101.

Figure 3:
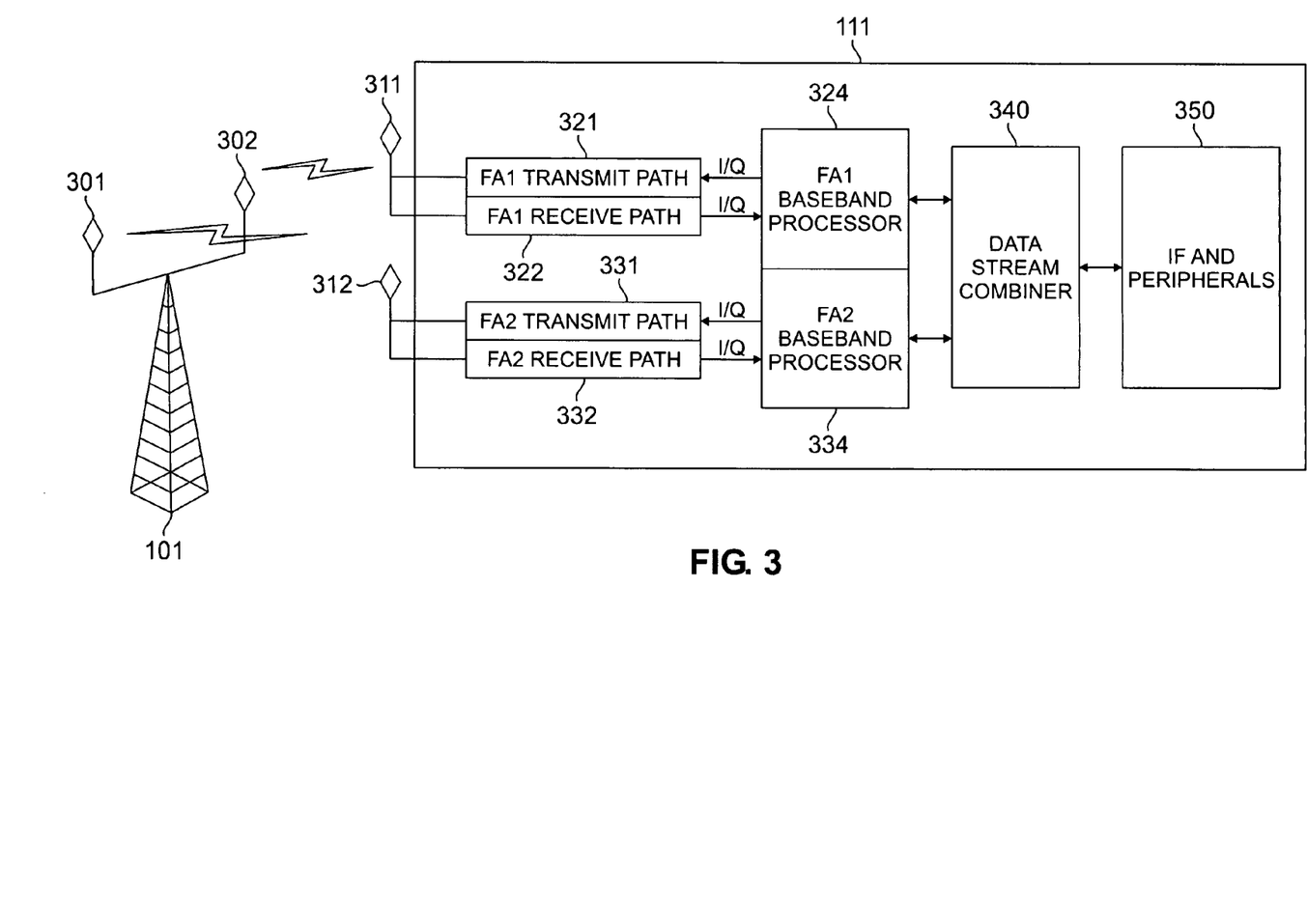
FIG. 3 illustrates an exemplary mobile station in a Type 1 configuration according to one embodiment of the present invention.

FIG. 3 illustrates exemplary mobile station 111 in a Type 1 configuration according to one embodiment of the present invention. MS 111 is shown as a high-level block diagram. BS 101 transmits data to MS 111 using two antennas. Antenna 301 transmits voice and/or data on a first carrier or frequency assignment (FA1). Antenna 302 transmits voice and/or data on a second carrier or frequency assignment (FA2).

MS 111 comprises antennas 311 and 312, FA1 transmit path 321, FA1 receive path 322, FA1 baseband processor 324, FA2 transmit path 331, FA2 receive path 332, FA2 baseband processor 334, data stream combiner 340 and IF and peripherals block 350. FA1 transmit path 321 and FA1 receive path 322 communicate with antenna 301 on carrier FA1. FA2 transmit path 331 and FA2 receive path 332 communicate with antenna 302 on carrier FA2. According to the exemplary embodiment in FIG. 2, MS 111 implements quadrature phase shift keying (QPSK) modulation, so that FA1 transmit path 321 and FA1 receive path 322 each have an in-phase (I) component and a quadrature (Q) component. Similarly, FA2 transmit path 331 and FA2 receive path 332 each have an in-phase (I) component and a quadrature (Q) component.

In the forward channel, FA1 baseband processor 324 performs the necessary decoding and other baseband processing functions to recover the forward channel data from antenna 301. Similarly, FA2 baseband processor 334 performs the necessary decoding and other baseband processing functions to recover the forward channel data from antenna 302. The recovered data from FA1 baseband processor 324 and FA2 baseband processor 334 are sent to data stream combiner 340 in order to combine the data from each carrier. The combined data stream is then sent to IF and peripherals block 350, which represents the user and/or machine interfaces and peripherals associated with MS 111, such as display screen, speakers, memory, and the like.

Figure 4:
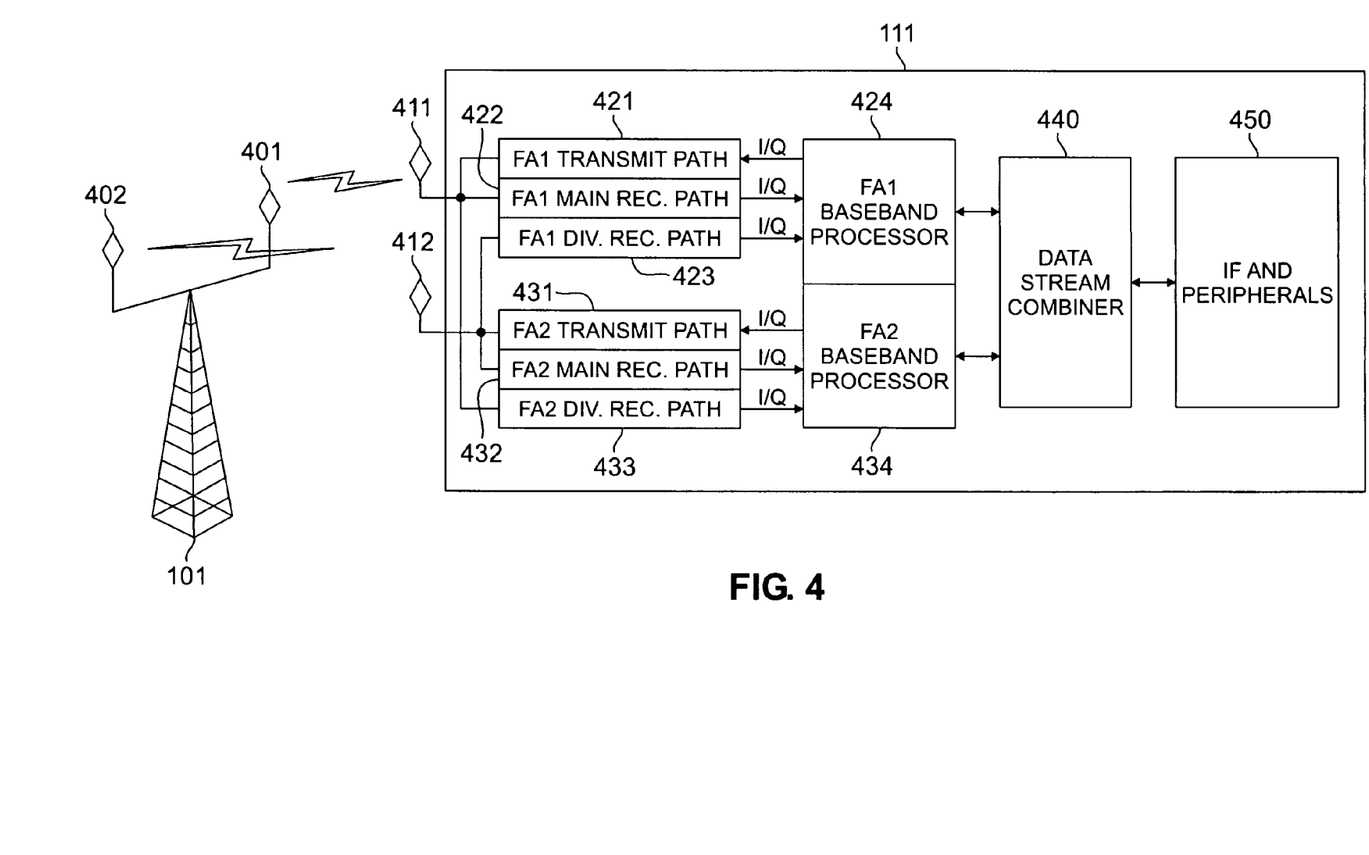
FIG. 4 illustrates an exemplary mobile station in a Type 2 configuration according to one embodiment of the present invention.

FIG. 4 illustrates exemplary mobile station 111 in a Type 2 configuration according to one embodiment of the present invention. MS 111 is shown as a high-level block diagram. BS 101 transmits data to MS 111 using two antennas. Antenna 401 transmits voice and/or data on a first carrier or frequency assignment (FA1). Antenna 402 transmits voice and/or data on a second carrier or frequency assignment (FA2). However, MS 111 uses an antenna diversity configuration to improve reception and increase the data rate in the downlink.

MS 111 comprises antennas 411 and 412, FA1 transmit path 421, FA1 main receive path 432, FA1 diversity receive path 423, FA1 baseband processor 424, FA2 transmit path 431, FA2 main receive path 432, FA2 diversity receive path 433, FA2 baseband processor 434, data stream combiner 440 and IF and peripherals block 450. FA1 transmit path 421, FA1 main receive path 422, and FA1 diversity receive path 423 communicate with antenna 401 on carrier FA1. FA2 transmit path 431, FA2 main receive path 432, and FA2 diversity receive path 433 communicate with antenna 402 on carrier FA2. According to the exemplary embodiment in FIG. 2, MS 111 implements quadrature phase shift keying (QPSK) modulation, so that FA1 transmit path 421, FA1 main receive path 422, and FA1 diversity receive path 423 each have an in-phase (I) component and a quadrature (Q) component. Similarly, FA2 transmit path 431, FA2 main receive path 432, and FA2 diversity receive path 433 each have an in-phase (I) component and a quadrature (Q) component.

In the forward channel, FA1 baseband processor 424 performs the necessary decoding and other baseband processing functions to recover the forward channel data from antenna 401. Similarly, FA2 baseband processor 434 performs the necessary decoding and other baseband processing functions to recover the forward channel data from antenna 402. The recovered data from FA1 baseband processor 424 and FA2 baseband processor 434 are sent to data stream combiner 440 in order to combine the data from each carrier. The combined data stream is then sent to IF and peripherals block 450, which represents the user and/or machine interfaces and peripherals associated with MS 111, such as display screen, speakers, memory, and the like.

Figure 5:
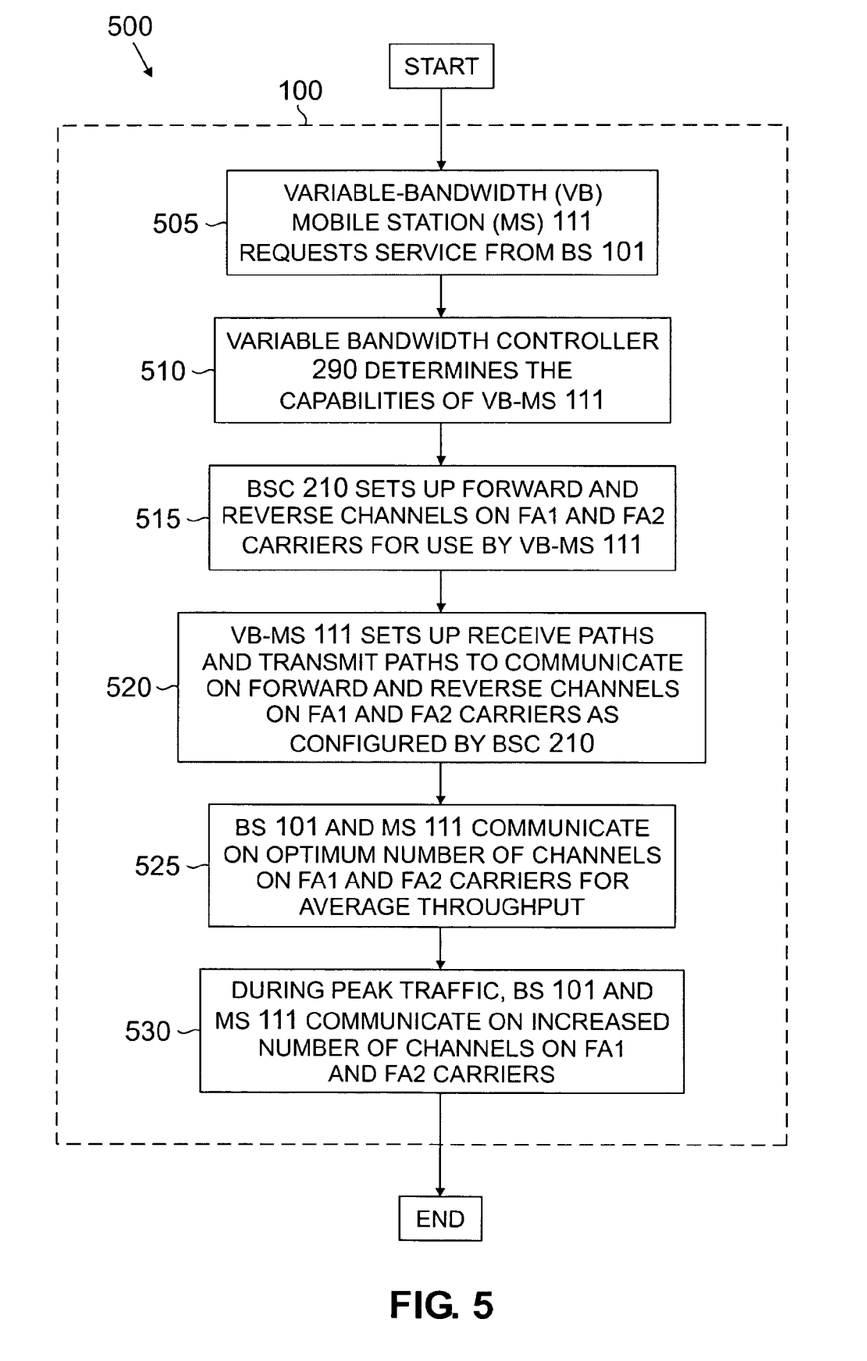
FIG. 5 is a flow diagram illustrating the operation of BS 101 and MS 111 according to the principles of the present invention.

FIG. 5 depicts flow diagram 500, which illustrates the operation of BS 101 and MS 111 according to the principles of the present invention. Initially, variable-bandwidth (VB) mobile station (MS) 111 requests service from BS 101 (process step 505). Variable bandwidth controller 290 then determines the capabilities of VB-MS 111 (process step 510). Depending on the capabilities of VB-MS 111, BSC 210 sets up forward and reverse channels on the FA1 and FA2 carriers for use by VB-MS 111 (process step 515). In response to commands received from BSC 210, VB-MS 111 then sets up the receive paths and the transmit paths to communicate on the forward and reverse channels on the FA1 and FA2 carriers established by BSC 210 (process step 520).

Thereafter, during routine operation, BS 101 and MS 101 communicate on the optimum number of channels on the FA1 and FA2 carriers to handle the average throughput (process step 525). However, during peak traffic, BS 101 and MS 101 may communicate on increased number of channels on the FA1 and FA2 carriers, depending on demand (process step 530). The increase demand may be determined by MS 111, which may request additional bandwidth on the FA1 and FA2 carriers. Alternative, BSC 210 may determine that additional bandwidth is required for a particular application and simply assign the additional bandwidth on the FA1 and FA2 carriers to MS 111.

Advantageously, the increased frequency spectrum and the time and coding diversification greatly improve the average throughput. The present invention does not require dedicated hardware at the base station for implementation in 1xEV-DV networks. Also, since two carriers are used, it is possible to do a soft handover of a mobile station from FA1 carrier to FA2 carrier and vice versa.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network comprising a plurality of base stations operating on at least two carriers, a variable bandwidth controller configured to operate in said network and further configured to:
   determine a receiver capability of a variable-bandwidth first mobile station operating within said network; and
   in response to said determination, assign said first mobile station to operate on at least a first carrier and a second carrier for at least one specified channel among a plurality of channels with dissimilar bandwidths, the specified channel comprising one of a forward channel and a reverse channel,
   wherein a selection of the at least one specified channel is determined by a bandwidth required by the first mobile station based upon an application executed on the first mobile station as detected by at least one of the plurality of base stations, and
   wherein the determination of the receiver capability of the variable-bandwidth first mobile station comprises determining whether the first mobile station is capable of receiving on more than one carrier.

2. The variable bandwidth controller as set forth in claim 1, wherein said variable bandwidth controller is configured to determine said receiver capability of said first mobile station based on a message received from said first mobile station.

3. The variable bandwidth controller as set forth in claim 2, wherein said message is a control message in said network.

4. The variable bandwidth controller as set forth in claim 1, wherein said variable bandwidth controller is configured to assign said mobile station to operate on said first carrier during normal data traffic conditions and assign said mobile station to operate on said second carrier during peak data traffic conditions.

5. The variable bandwidth controller as set forth in claim 4, wherein said variable bandwidth controller is configured to dynamically assign said first mobile station to operate on said second carrier based on changes in traffic demand.

6. The variable bandwidth controller as set forth in claim 5, wherein said variable bandwidth controller is configured to assign said first mobile station to operate on said second carrier in response to a determination by said variable bandwidth controller that said first mobile station requires additional bandwidth in a forward channel.

7. The variable bandwidth controller as set forth in claim 5, wherein said variable bandwidth controller is configured to assign said first mobile station to operate on said second carrier in response to a request from said first mobile station for additional bandwidth in a forward channel.

8. The variable bandwidth controller as set forth in claim 7, wherein said variable bandwidth controller is disposed in a base station controller of a first base station.

9. An IS-2000 compatible wireless network comprising:
   a plurality of base stations configured to communicate on at least two carriers with a plurality of mobile stations in a coverage area of said IS-2000 compatible wireless network; and
   a variable bandwidth controller configured to:
      determine a receiver capability of a variable-bandwidth first mobile station operating within said IS-2000 compatible network, and
      in response to said determination, assign said first mobile station to operate on at least a first carrier and a second carrier for at least one specified channel, the specified channel comprising one of a forward channel and a reverse channel, and
   wherein a selection of the at least one specified channel is based upon a application executed on the first mobile station as detected by at least one of the plurality of base stations.

10. The wireless network as set forth in claim 9, wherein said variable bandwidth controller is configured to determine said receiver capability of said first mobile station based on a message received from said first mobile station.

11. The wireless network as set forth in claim 10, wherein said message is a control message in said IS-2000 compatible network.

12. The wireless network as set forth in claim 9, wherein said variable bandwidth controller is configured to assign said mobile station to operate on said first carrier during normal data traffic conditions and assign said mobile station to operate on said second carrier during peak data traffic conditions.

13. The wireless network as set forth in claim 12, wherein said variable bandwidth controller is configured to dynamically assign said first mobile station to operate on said second carrier based on changes in traffic demand.

14. The wireless network as set forth in claim 13, wherein said variable bandwidth controller is configured to assign said first mobile station to operate on said second carrier in response to a determination by said variable bandwidth controller that said first mobile station requires additional bandwidth in a forward channel.

15. The wireless network as set forth in claim 13, wherein said variable bandwidth controller is configured to assign said first mobile station to operate on said second carrier in response to a request from said first mobile station for additional bandwidth in a forward channel.

16. The wireless network as set forth in claim 15, wherein said variable bandwidth controller is disposed in a base station controller of a first base station.

17. A variable-bandwidth mobile station capable of communicating with a plurality of base stations of an IS-2000 compatible wireless network, said mobile station comprising:
   a first receive path configured to receive data from a first of said plurality of base stations in said IS-2000 compatible wireless network on a first carrier; and
   a second receive path configured to receive data from said first base station on a second carrier,
   wherein said mobile station is configured to receive control messages from said first base station assigning said mobile station to receive data from said first base station on said first carrier during normal traffic conditions and assigning said mobile station to receive data from said first base station on said second carrier and first carrier for at least one specified channel among a plurality of channels with dissimilar bandwidths, the specified channel comprising one of a forward channel and a reverse channel, and
   wherein a selection of the at least one specified channel is based upon an application executed on the mobile station as detected by at least one of the plurality of base stations.

18. The mobile station as set forth in claim 17, wherein said mobile station is configured to transmit a control message to said first base station identifying a receiver capability of said mobile station.

19. The mobile station as set forth in claim 18, wherein said first and second receive paths of said mobile station are configured to be dynamically assigned to operate on said first and second carriers based on changes in traffic demand.

20. The mobile station as set forth in claim 19, wherein said mobile station is configured to request that additional bandwidth in a forward channel be assigned to said first mobile station.

21. For use in an IS-2000 compatible wireless network comprising a plurality of base stations capable of operating on at least two carriers, a method of handling communications between a first of the plurality of base stations and a mobile station-comprising:

receiving in the first base station a control message identifying a type of the mobile station, the mobile station operating within the IS-2000 compatible network;

determining by the first base station a receiver capability and whether the first mobile station is capable of receiving on more than one carrier from the mobile station type; and in response to the determination of the receiver capability, assigning the mobile station to operate on at least a first carrier and a second carrier for at least one specified channel, the specified channel comprising one of a forward channel and a reverse channel; and determining a bandwidth required by the mobile station based upon a bandwidth message received from the mobile station, wherein a selection of the at least one specified channel is based upon an application executed on the mobile station as detected by at least one of the plurality of base stations.

22. The method as set forth in claim 21, further comprising modifying the assignment of the mobile station to the first and second carriers depending on changes in data traffic being transmitted to the mobile station.

\* \* \* \* \*